United States Patent [19]

Ushikoshi

[11] Patent Number: 4,848,143
[45] Date of Patent: Jul. 18, 1989

[54] TIRE ENDURANCE TESTING MACHINE
[75] Inventor: Michihiro Ushikoshi, Tokyo, Japan
[73] Assignee: T & T Co., Ltd., Tokyo, Japan
[21] Appl. No.: 198,797
[22] Filed: May 25, 1988
[30] Foreign Application Priority Data May 25, 1987 [JP] Japan .................................. 62-78644

[51] Int. Cl.⁴ .......................................... G01M 17/02
[52] U.S. Cl. ...................................................... 73/146
[58] Field of Search ............................... 73/146, 7, 8, 9

[56] References Cited

U.S. PATENT DOCUMENTS

| | | | |
|---|---|---|---|
| 3,546,936 | 12/1970 | Tarpinian et al. | 73/146 |
| 4,160,378 | 7/1979 | Himmler | 73/146 |
| 4,344,325 | 8/1982 | Iwama | 73/146 |

Primary Examiner—Donald O. Woodiel
Attorney, Agent, or Firm—Armstrong, Nikaido, Marmelstein, Kubovcik & Murray

[57] ABSTRACT

A tire endurance testing machine comprising a main frame; a drum rotatably provided on the main frame; two load carriage guides suspended in parallel in the up-and-down direction on the main frame; a tire loading carriage provided on the load carriage guide, which is movable to the direction of the outer surface of the drum; a carriage arm rotatably provided on the tip portion of the tire loading carriage, which gives a slip angle to the outer surface of the drum; an assembled tire spindle rotatably provided on the tip of the carriage arm which gives a camber angle to the outer surface of the drum; a loading hydraulic cylinder which loads the tire loading carriage to the direction of the outer surface of the drum; and actuating cylinder for slip angle provided on the tire loading carriage, which rotates the carriage arm; an actuating cylinder for camber angle provided on the carriage arm, which rotates the assembled tire spindle; a tire spindle provided on the assembled tire spindle, which is movable in the widthwise direction of the outer surface of the drum; and an actuator which moves the tire mounted on the assembled tire spindle, to the widthwise direction of the outer surface of the drum.

5 Claims, 8 Drawing Sheets

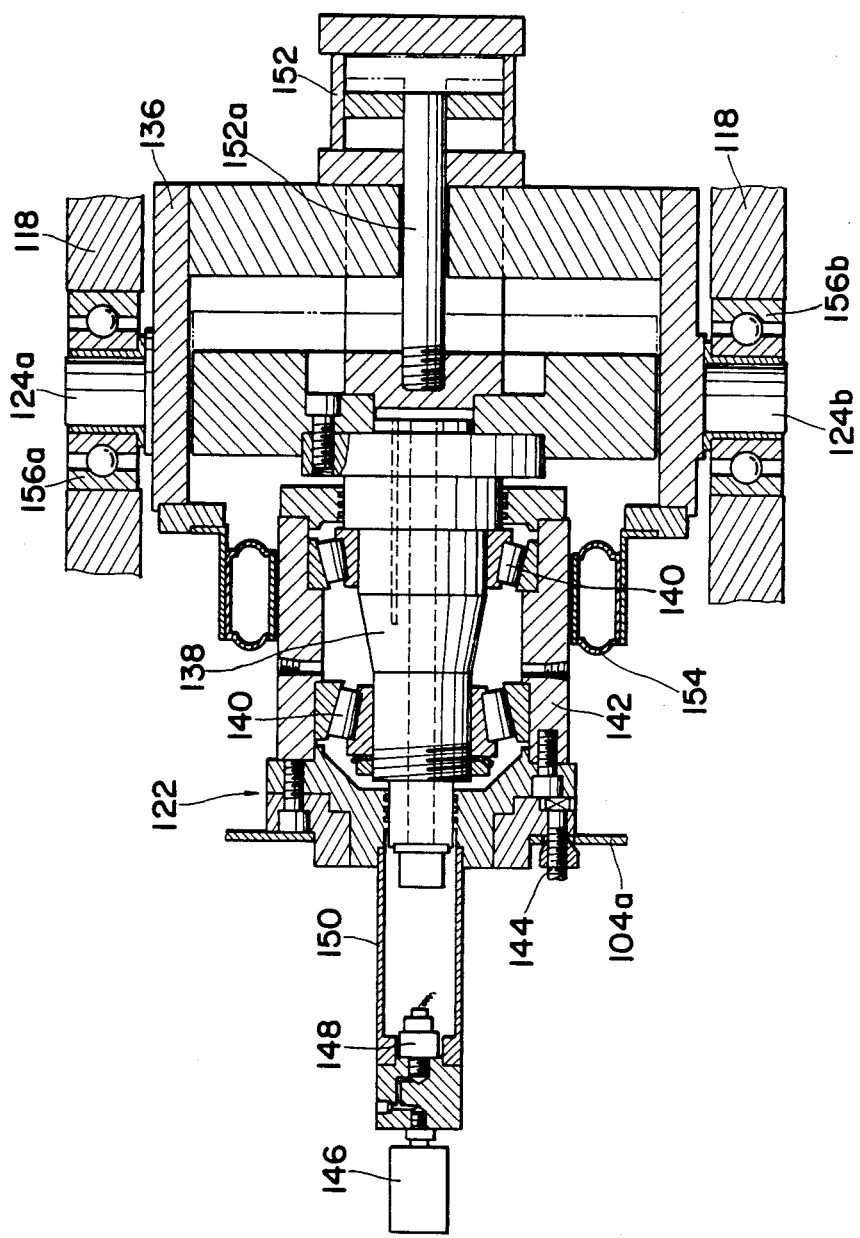

TIRE ENDURANCE TESTING MACHINE

BACKGROUND OF THE INVENTION

I. Field of the Invention

This invention relates to a tire endurance testing machine for testing various characteristics and endurance of tires by loading a tire with a slip angle and a camber angle to a rotating drum.

II. Description of the Related Art

As shown in FIGS. 1 to 3, a conventional tire endurance testing machine 50 has a rotatable drum on one side of the main frame 52, to which drum a tire 54 is loaded. The drum 56 is rotated by an electromotor through a timing belt or the like, which are not shown. Two load carriage guides 58a and 58b are suspended in parallel in the up-and-down direction between the vertical frames 52a and 52b. A tire loading carriage 60 is movably provided on the load carriage guides 58a and 58b. A carriage arm 62 is rotatably mounted on the tire loading carriage 60 by means of a carriage arm-supporting axle 64. An assembled tire spindle 66 is rotatably provided on the tip of the carriage arm 62 by means of an assembled tire spindle-supporting axles 68a and 68b. A tire 54 is mounted on a tire spindle 70 of the assembled tire spindle 66.

A loading hydraulic cylinder 72 which pushes the tire loading carriage 60 to the direction of the outer surface of the drum is provided on the vertical frame 52a of the main frame 52. An actuating cylinder for slip angle 74 which gives a slip angle to the carriage arm 62 is provided on the tire loading carriage 60. An actuating cylinder for camber angle 76 which gives a camber angle to the assembled tire spindle 66 is provided on the carriage arm 62.

In operation for determining various characteristics and endurance of the tire 54, the tire 54 is mounted on the tire spindle 70 of the assembled tire spindle 66 and the carriage arm 62 is rotated by the actuating cylinder for slip angle 74 to provide a prescribed slip angle to the tire 54. At the same time, the assembled tire spindle 66 is rotated by the actuating cylinder for camber angle 76 to provide a prescribed camber angle to the tire 54 and the tire loading carriage 60 is pushed with a prescribed load by the loading hydraulic cylinder 72 so as to load the tire 54 to the outer surface of the drum 56. In these conditions, the drum 56 is rotated and the various characteristics and endurance of the tire 54 are determined.

In the above-described conventional tire endurance testing machine 50, the assembled tire spindle-supporting axles (hereinafter referred to as "camber axles" for short) 68a and 68b for giving the camber angle to the tire 54 is located at the tip portion of the carriage arm 62, so that it is located away from the carriage arm-supporting axle 64 which gives the slip angle to the carriage arm 62. As a result, when the assembled tire spindle 66 is rotated by the actuating cylinder for camber angle 76, the center of the contact portions 54a and 56a of the outer surface of the drum 56 with the tire 54 is shifted from the center line CL to the position designated by the reference numerals 54b and 56a, which center line CL is coincidence with the axis of the carriage arm-supporting axle 64 and which penetrates the center of the outer surface of the drum 56. Thus, when the camber angle and the slip angle are simultaneously given to the tire 54, the tire 54 contacts the drum 56 at a portion shifted from the center line CL. If the camber angle and/or the slip angle is large, by the influence of the curvature of the drum 56, the direction in which the tire 54 is loaded to the drum 56 and the direction in which the reaction by the drum 56 is exerted are changed, so that the strength of the force exerted to the tire 54 by the operation of the cylinders 72, 74 and 76 becomes different from the strength of the reaction by the drum 56, which is received by the tire 54. Thus, the camber angle and the slip angle, as well as the load cannot be given to the tire 54 under precise control.

SUMMARY OF THE INVENTION

Accordingly, the object of the present invention is to provide a tire endurance testing machine in which the tire contacts the outer surface of the drum at a fixed portion even in cases where the tire is contacted with the rotating drum while simultaneously giving the slip angle and the camber angle, so as to assure that the camber angle and the slip angle, as well as the load can be given to the tire under precise control.

Another object of the present invention is to provide a tire endurance testing machine in which the reaction by the carriage arm which is generated when the tire is loaded to the outer surface of the drum is received by the tire loading carriage so as to reduce the reaction exerted to the carriage arm.

The present invention provides a tire endurance testing machine comprising a main frame; a drum rotatably provided on the main frame; two load carriage guides suspended in parallel in the up-and-down direction on the main frame; a tire loading carriage provided on the load carriage guide, which is movable to the direction of the outer surface of the drum; a carriage arm rotatably provided on the tip portion of the tire loading carriage, which gives a slip angle to the outer surface of the drum; an assembled tire spindle rotatably provided on the tip of the carriage arm which gives a camber angle to the outer surface of the drum; a loading hydraulic cylinder which loads the tire loading carriage to the direction of the outer surface of the drum; an actuating cylinder for slip angle provided on the tire loading carriage, which rotates the carriage arm; an actuating cylinder for camber angle provided on the carriage arm, which rotates the assembled tire spindle; a tire spindle provided on the assembled tire spindle, which is movable in the widthwise direction of the outer surface of the drum; and an actuator which moves the tire mounted on the assembled tire spindle in the widthwise direction of the outer surface of the drum.

With the above-described structure, when the assembled tire spindle is rotated by the actuating 10 cylinder for camber angle to give the camber angle to the tire, the tire can be loaded to the drum at a fixed portion by shifting the tire in the widthwise direction of the outer surface of the drum by the actuator so as to make the center of the contact portion of the tire coincident with the center line of the outer surface of the drum, i.e., with the rotating axis of the carriage arm-supporting axle. Thus, the direction of the force loading the tire to the drum and the direction of the reaction by the drum, which is received by the drum are made coincident, so that the prescribed camber angle and slip angle, as well as the load can accurately be given.

Further, in the above-described tire endurance testing machine of the present invention, a cylinder support for the actuating cylinder for camber angle is protrusively provided on the carriage arm and a pair of holders which supports the cylinder support are provided on the tire loading carriage.

With this construction, the reaction generated on the carriage arm is received by the tire loading carriage so as to reduce the reaction exerted to the carriage arm.

BRIEF DESCRIPTION OF THE DRAWINGS

FIGS. 1 to 3 show a conventional tire endurance testing machine wherein:

FIG. 1 is a partly-sectioned front view of the conventional tire endurance testing machine;

FIG. 2 is a side sectional view of the important portion of the conventional tire endurance testing machine; and FIG. 3 is a plan sectional view showing the important portion of the conventional tire endurance testing machine;

FIGS. 4 to 8 show one embodiment of the tire endurance testing machine of the present invention wherein:

FIG. 4 is a partly-sectioned front view of the tire endurance testing machine of the present invention;

FIG. 5 is a plan view of the tire endurance testing machine of the present invention;

FIG. 6 is a side sectional view of the important portion of the tire endurance testing machine of the present invention;

FIG. 7 is a plan view of the important portion of the tire endurance testing machine of the present invention; and FIG. 8 is a sectional view of the assembled tire spindle;

FIGS. 9 and 10 show another example of the tire endurance testing machine of the present invention wherein:

FIG. 9 is a plan view of the important portion of the tire endurance testing machine of the present invention; and FIG. 10 is a side sectional view of the important portion of the tire endurance testing machine of the present invention.

DETAILED DESCRIPTION OF THE PREFERRED EMBODIMENTS

Figure 1:
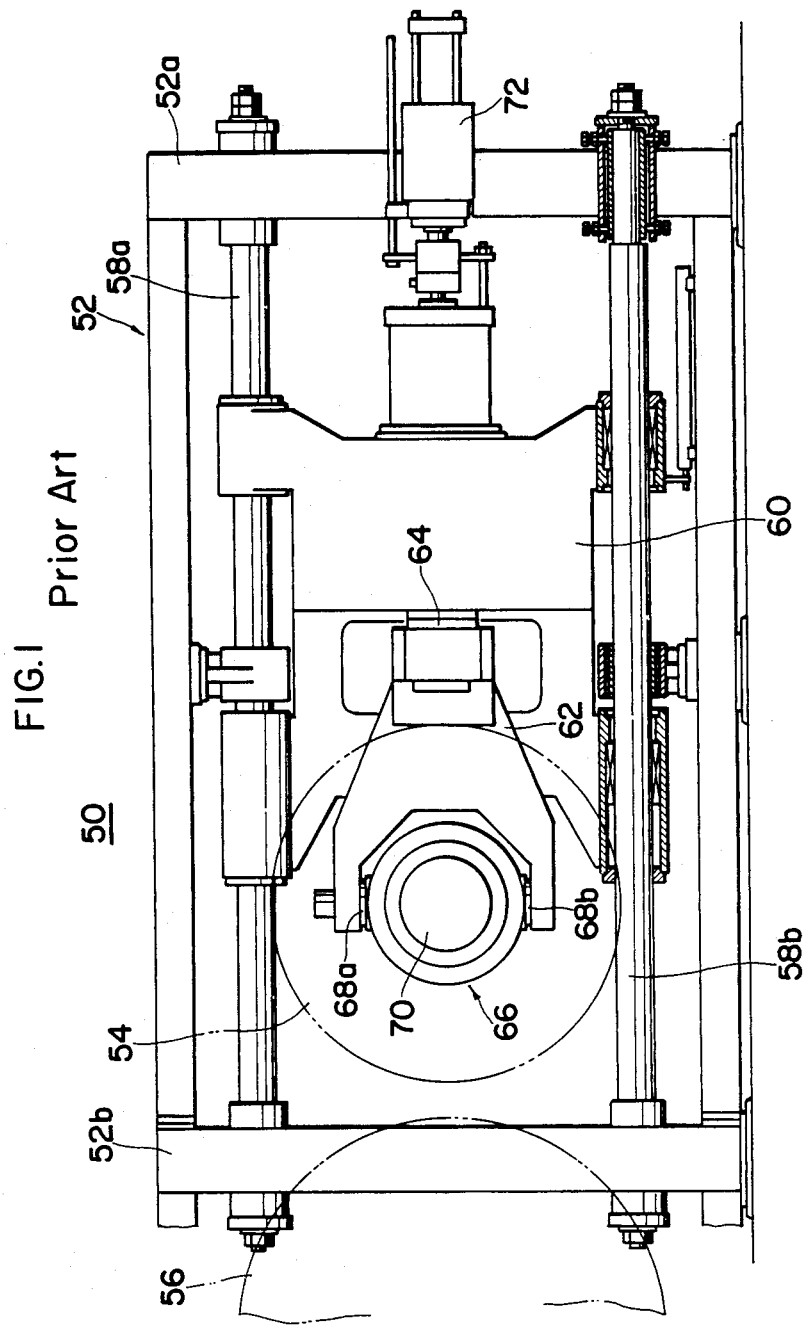
Figure 2:
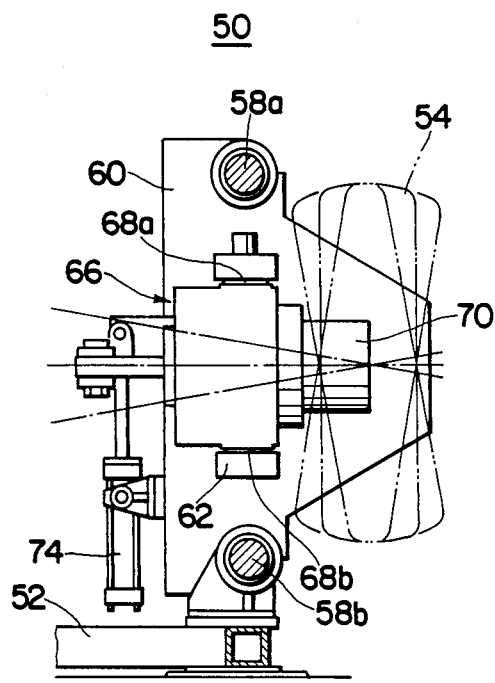
Figure 3:
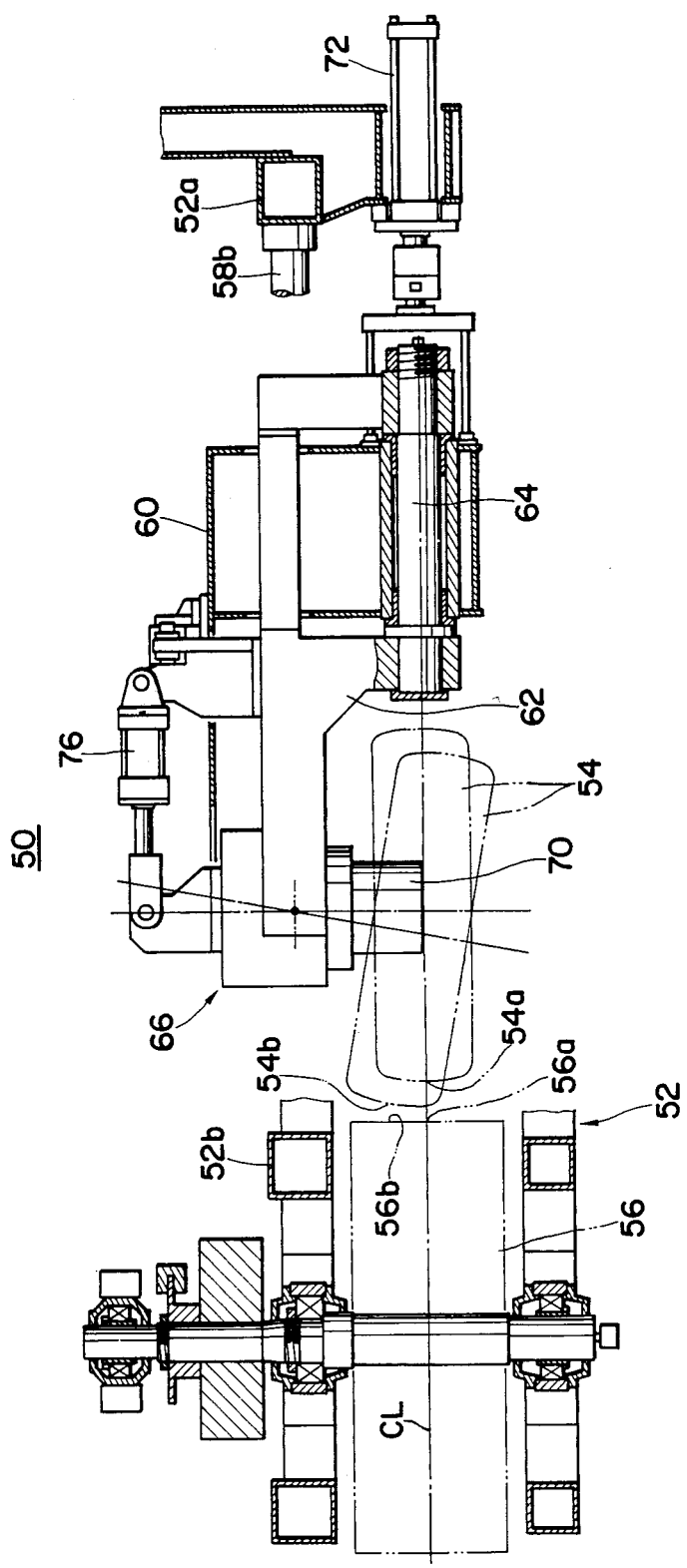
Figure 4:
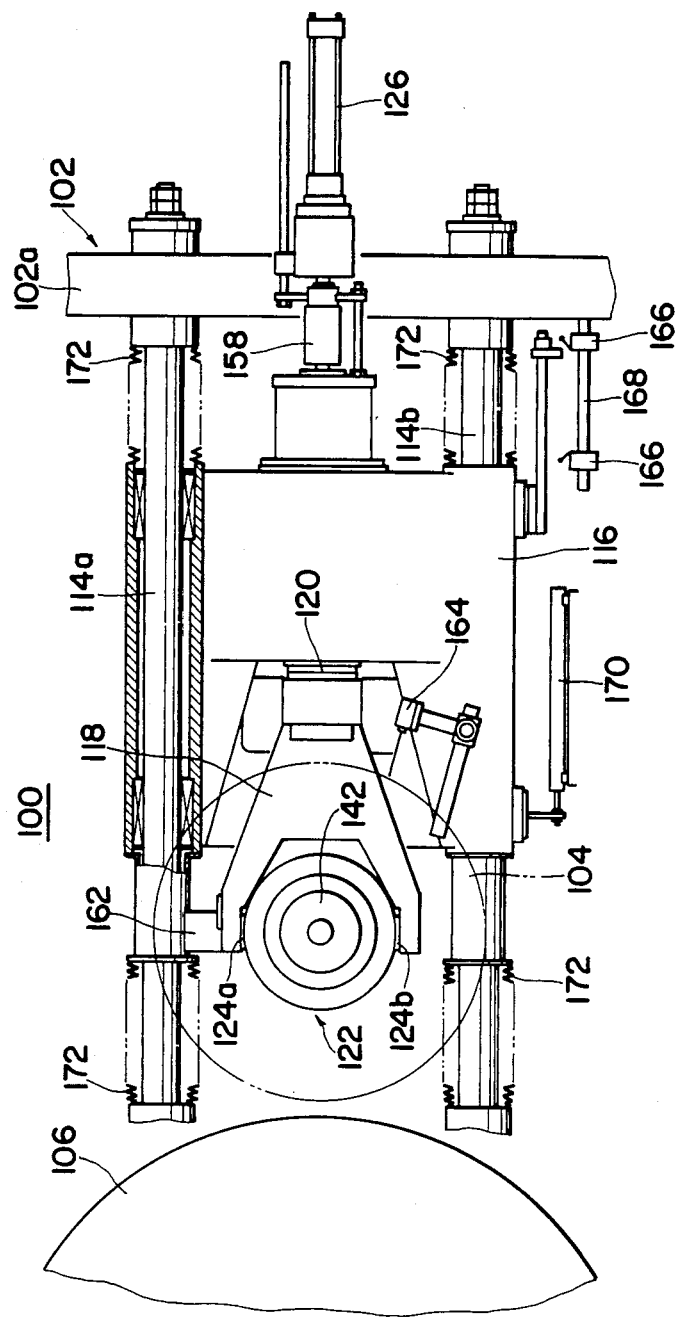
Figure 5:
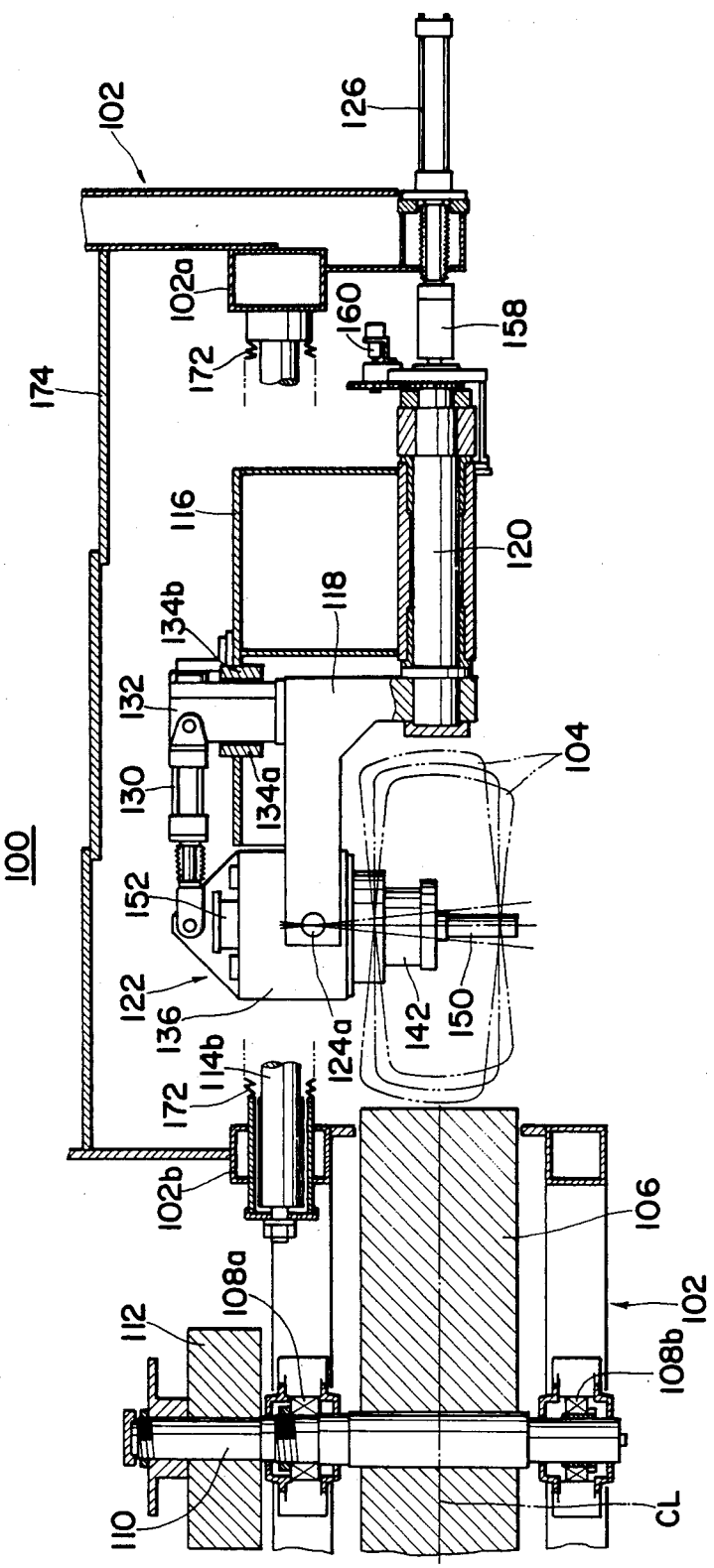

One embodiment of the present invention will now be described referring to FIGS. 4 to 8.

In the tire endurance testing machine 100, a drum 106 to which a tire 104 is loaded is rotatably mounted on a main frame 102. The drum 106 is fixed to a drum shaft 110 which is rotatably mounted on the main frame 102 via the bearings 108a and 108b, and is rotated by an electromotor (not shown) provided on the main frame 102 via a timing belt (not shown) suspended on a gear pully 112 fixed on one end of the drum shaft 110.

Between vertical frames 102a and 102b of the main frame 102, two load carriage guides 114a and 114b are suspended in parallel in the up-and-down direction in the direction of the outer surface of the drum 106. A tire loading carriage 116 is movably provided on the load carriage guides 114a and 114b. A carriage arm 118 is rotatably provided on the tip portion of the tire loading carriage by means of a carriage arm-supporting axle 120. The carriage arm-supporting axle 120 is provided on the tire loading carriage 116 such that its axis is coincident with a center line CL penetrating the widthwise center of the outer surface of the drum 106.

An assembled tire spindle 122 is rotatably provided on the tip of the carriage arm 118 by means of camber axles 124a and 124b.

A loading hydraulic cylinder 126 which loads the tire loading carriage 116 to the direction of the outer surface of the drum is provided on the vertical frame 102a of the main frame 102. An actuating cylinder for slip angle 128 which gives a slip angle to the carriage arm 118 is provided on the tire loading carriage 116. An actuating cylinder for camber angle 130 which gives a camber angle to the assembled tire spindle 122 is provided on a cylinder support 132 which is protrusively formed on the back surface of the carriage arm 118.

The cylinder support 132 is supported by a pair of holders 134a and 134b provided on the backside of the tire loading carriage, and which transmits the reaction by the carriage arm 118 when the tire 104 is loaded to the drum 106 so as to reduce the load of the carriage arm 118.

The assembled tire spindle 122 comprises a spindle housing 136, a tire position adjusting spindle 138 of which proximal end is movably provided in the spindle housing 136 and of which terminal end is protruded from the spindle housing, and a tire spindle 142 rotatably provided on the tire position ajusting spindle 138 via a bearing 140. On the front end of the tire spindle 142, a tire & wheel mounting bolt 144 is set upright and a tire wheel disk 104a is mounted thereon. A holder case 150 comprising a rotary union 146 on its end and a pressure transducer 148 is provided on the center portion of the front end of the tire spindle 142. On the back side of the spindle housing 136, an actuator such as a hydraulic cylinder 152 is provided. By putting in and out a driving rod 152a of the actuator 152, the tire position adjusting spindle 138 and the tire spindle 142 are moved in the direction of the axis of the tire position adjusting spindle 138, i.e., in the direction of the widthwise direction of the outer surface of the drum 106. On the front end of the spindle housing 136, an air actuating brake (phragm brake) 144 is provided. The assembled tire spindle 122 is rotatably provided on the carriage arm 118 via the camber axles 124a and 124b provided upper and lower portions of the spindle housing 136 by means of the bearings 156a and 156b, respectively.

Reference numeral 158 denotes a load cell, 160 denotes a slip angle sensor which measures the slip angle given to the tire 104, 162 denotes a camber angle sensor which measures the camber angle given to the tire 104, 164 denotes a blister detector of the tire 104, 166 denotes a limit switch for over travel mounted on a limit switch operating bar 168, 170 denotes a tire load radius sensor which measures the tire load radius by sensing the moving distance of the tire loading carriage 116, 172 denotes a way boot, and 174 denotes a safety cage.

The operation of the tire endurance testing machine 100 will now be described.

Firstly, the tire wheel disk 104a is connected to the tire & wheel mounting bolt 144 of the tire spindle 142 to mount the tire 104 on the tire spindle 142.

Figure 6:
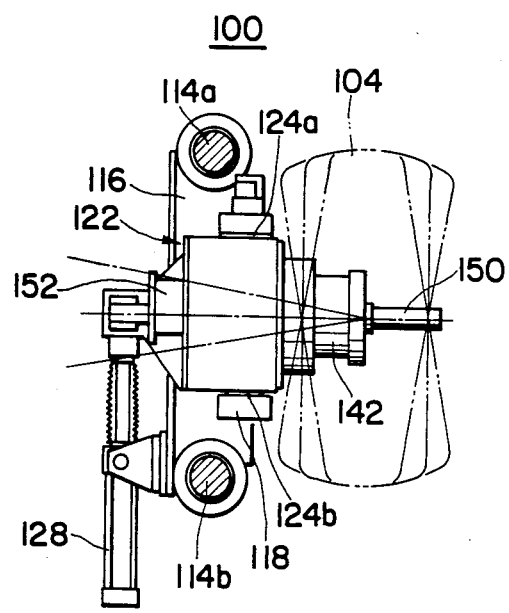

The actuating cylinder for slip angle 128 rotates the carriage arm 118 around the carriage arm-supporting axle 120, so as to give a prescribed slip angle to the tire 104 as shown by the phantom line in FIG. 6.

Figure 7:
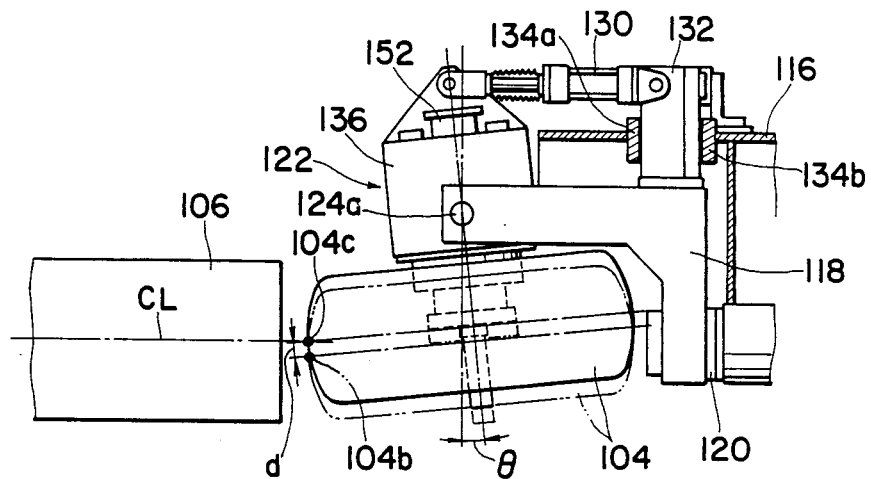

The actuating cylinder for camber angle 130 rotates the assembled tire spindle 122 about the camber axles 124a and 124b to give the camber angle $\theta$ to the tire 104 as shown in FIG. 7. By so doing, as shown by the phantom line in FIG. 7, the center 104b of the contact portion of the tire 104 is shifted to the position away from the center line CL of the drum 106 by the distance d. The distance d is governed by the radius of the tire 104 and the camber angle $\theta$. The distance d is calculated from the values from the camber angle sensor 162 and the tire load radius sensor 170. The driving rod 152a of the actuator 152 is drawn into the actuator 152 by the distance d to move the tire position adjusting spindle 138 together with the tire spindle 142, so as to move the center 104b of the contact portion of the tire 104 to the position 104c intersecting the center line CL of the drum 106.

The loading hydraulic cylinder 126 is then operated to move the tire loading carriage 116 to the direction of the outer surface of the drum 106 along the load carriage guides 114a and 114b, so as to load the tire 104 to the outer surface of the drum 106 with a prescribed force. In these conditions, the drum 106 is rotated and various characteristics and endurance of the tire 104 are determined.

By operating the actuator 152 depending on the camber angle $\theta$ given to the tire 104, the center 104b of the contact portion of the tire 104 can be made coincident with the center line CL of the drum 106 or the axis of the carriage arm-supporting axle 120 which is the axis of the rotation of the carriage arm-supporting axle. Thus, even when the camber angle and the slip angle are simultaneously given to the tire 104, the contact portion of the tire 104 and the drum 106 can be kept at a prescribed position. Therefore, a prescribed camber angle and a slip angle, as well as a prescribed load can accurately be given to the tire 104 since the direction in which the tire 104 is loaded to the drum 106 and the direction in which the reaction from the drum 106 which is received by the tire 104 can be made coincident.

Figure 9:
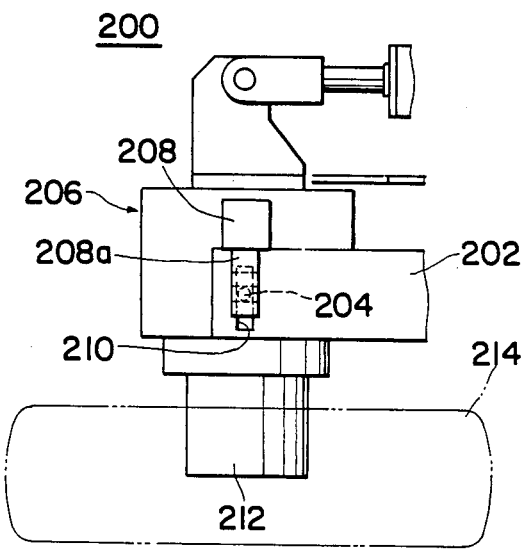
Figure 10:
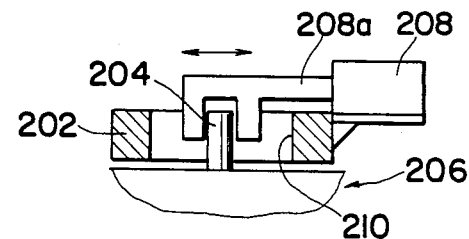

Another embodiment of the tire endurance testing machine of the present invention will now be described referring to FIGS. 9 and 10.

The tire endurance testing machine 200 has an assembled tire spindle 206 which is similar to the conventional assembled tire spindle provided on a carriage arm 202, which is movable in the widthwise direction of the outer surface of the drum. Further, an actuator such as a hydraulic cylinder 208 is provided on the carriage arm 202. Other structures are the same as the above-described embodiment.

In the upper and lower end portions of the carriage arm 202, an elongated hole 210 is formed. The camber axle 204 is rotatably and movably inserted in the elongated hole 210. An actuator 208 is provided on the carriage arm 202. The tip of the driving rod 208 of the actuator 208 is fitted to the camber axle 204 and the camber axle 204 is moved along the elongated hole 210 by the operation of the driving rod 208a. By this, the assembled tire spindle 206 is moved and, in turn, the tire 214 mounted on the tire spindle 212 of the assembled tire spindle 206 is moved in the widthwise direction of the outer surface of the drum. Each of these structures is provided on the upper and lower junction portions of the assembled tire spindle 206 and the carriage arm 202. By operating the upper and the lower actuators 208 in synchronism, the assembled tire spindle 206 is moved in the widthwise direction of the outer surface of the drum, so as to set the contact portion of the tire with the drum to the prescribed position as in the above-described embodiment.

The tire endurance testing machine has the same testing apparatus at the symmetrical position about the drum, so that two tires can be loaded to the drum from the opposite direction to conduct the test for both tires simultaneously.

Although the invention has been described based on a specific example thereof, it is apparent for those skilled in the art that various modification can be made without departing from the spirit and scope of the present invention.

What is claimed is:

1. A tire endurance testing machine comprising:
    a main frame;
    a drum rotatably provided on the main frame;
    two load carriage guides suspended in parallel in the up-and-down direction on the main frame;
    a tire loading carriage provided on the load carriage guide, which is movable to the direction of the outer surface of the drum;
    a carriage arm rotatably provided on the tip portion of the tire loading carriage, which gives a slip angle to the outer surface of the drum;
    an assembled tire spindle rotatably provided on the tip of the carriage arm which gives a camber angle to the outer surface of the drum;
    a loading hydraulic cylinder which loads the tire loading carriage to the direction of the outer surface of the drum;
    an actuating cylinder for slip angle provided on the tire loading carriage, which rotates the carriage arm;
    an actuating cylinder for camber angle provided on the carriage arm, which rotates the assembled tire spindle;
    a tire spindle provided on the assembled tire spindle, which is movable in the widthwise direction of the outer surface of the drum;
    an actuator which moves the tire mounted on the assembled tire spindle, in the widthwise direction of the outer surface of the drum.

2. The tire endurance testing machine of claim 1, wherein the assembled tire spindle comprises a spindle housing; an assembled tire spindle supporting axle provided at the upper and lower portions of the spindle housing, which is rotatably supported by the carriage arm; a tire position adjusting spindle of which tip portion is projected from the spindle housing; and a tire spindle rotatably provided on the protruded portion of the tire position adjusting spindle, the proximal end portion of the assembled tire spindle being moved by the actuator.

3. The tire endurance testing machine of claim 1, wherein a cylinder support of the actuating cylinder for camber angle is protrusively provided on the carriage arm, and a pair of holders supporting the cylinder support are provided on the tire loading carriage.

4. A tire endurance testing machine comprising:
    a main frame;
    a drum rotatably provided on the main frame;
    two load carriage guides suspended in parallel in the up-and-down direction on the main frame;
    a tire loading carriage provided on the load carriage guide, which is movable to the direction of the outer surface of the drum;
    a carriage arm rotatably provided on the tire loading carriage, which gives a slip angle to the outer surface of the drum;
    an assembled tire spindle rotatably provided on the tip of the carriage arm which is movable in the widthwise direction of the outer surface of the drum, which gives a camber angle to the outer surface of the drum;

a loading hydraulic cylinder which loads the tire loading carriage to the direction of the outer surface of the drum;

an actuating cylinder for slip angle provided on the tire loading carriage, which rotates the carriage arm;

an actuating cylinder for camber angle provided on the carriage arm, which rotates the assembled tire spindle;

an actuator which moves the tire mounted on the assembled tire spindle, in the widthwise direction of the outer surface of the drum.

5. The tire endurance testing machine of claim 4, wherein a cylinder support of the actuating cylinder for camber angle is protrusively provided on the carriage arm, and a pair of holders supporting the cylinder support are provided on the tire loading carriage.

* * * * *